(12) United States Patent
Dwork et al.

(10) Patent No.: US 7,818,335 B2
(45) Date of Patent: Oct. 19, 2010

(54) SELECTIVE PRIVACY GUARANTEES

(75) Inventors: Cynthia Dwork, San Francisco, CA (US); Frank D. McSherry, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 999 days.

(21) Appl. No.: 11/316,791

(22) Filed: Dec. 22, 2005

(65) Prior Publication Data

US 2007/0147606 A1 Jun. 28, 2007

(51) Int. Cl.
*G06F 17/30* (2006.01)
*G06F 7/00* (2006.01)
(52) U.S. Cl. ...................................... 707/769; 707/772
(58) Field of Classification Search .............. 707/104.1, 707/101, 1, 769, 722
See application file for complete search history.

(56) References Cited

U.S. PATENT DOCUMENTS

| | | | |
|---|---|---|---|
| 4,141,071 A | 2/1979 | Yerkes et al. | |
| 5,794,178 A | 8/1998 | Caid et al. | |
| 6,253,203 B1 | 6/2001 | O'Flaherty et al. | |
| 6,345,252 B1 | 2/2002 | Beiqi et al. | |
| 6,636,887 B1 | 10/2003 | Augeri | |
| 7,043,640 B2 | 5/2006 | Pritchard et al. | |
| 7,162,456 B2 | 1/2007 | de Jong | |
| 7,363,192 B2 | 4/2008 | Dwork et al. | |
| 7,562,071 B2 | 7/2009 | Dwork et al. | |
| 7,698,250 B2 | 4/2010 | Dwork et al. | |
| 2001/0042068 A1 | 11/2001 | Yoshida et al. | |
| 2002/0010679 A1* | 1/2002 | Felsher | 705/51 |
| 2002/0065884 A1* | 5/2002 | Donoho et al. | 709/204 |
| 2002/0157020 A1 | 10/2002 | Royer | |
| 2003/0126139 A1 | 7/2003 | Lee et al. | |
| 2003/0204498 A1 | 10/2003 | Lehnert | |
| 2003/0229598 A1 | 12/2003 | de Jong | |
| 2004/0103066 A1 | 5/2004 | Staddon et al. | |
| 2004/0133927 A1* | 7/2004 | Sternberg et al. | 725/136 |
| 2004/0153456 A1 | 8/2004 | Charnock et al. | |
| 2005/0021488 A1 | 1/2005 | Agrawal et al. | |
| 2005/0183072 A1 | 8/2005 | Horning et al. | |
| 2005/0246391 A1 | 11/2005 | Gross | |
| 2005/0283455 A1 | 12/2005 | Kemmer et al. | |

(Continued)

OTHER PUBLICATIONS

Alexandre Valentinovich Evfimievski: "Privacy Preserving Information Sharing", A Dissertation Presented to the Faculty of the Graduate School of Cornell University in Partial Fulfillment of the Requirements for the Degree of Doctor of Philosophy, Aug. 2004.*

(Continued)

*Primary Examiner*—Kuen S Lu
(74) *Attorney, Agent, or Firm*—Woodcock Washburn LLP

(57) ABSTRACT

Systems and methods are provided for selectively determining privacy guarantees. For example, a first class of data may be guaranteed a first level of privacy, while other data classes are only guaranteed some lesser level of privacy. An amount of privacy is guaranteed by adding noise values to database query outputs. Noise distributions can be tailored to be appropriate for the particular data in a given database by calculating a "diameter" of the data. When the distribution is based on the diameter of a first class of data, and the diameter measurement does not account for additional data in the database, the result is that query outputs leak information about the additional data.

17 Claims, 6 Drawing Sheets

U.S. PATENT DOCUMENTS

| | | | |
|---|---|---|---|
| 2006/0200431 | A1 | 9/2006 | Dwork et al. |
| 2006/0259263 | A1 | 11/2006 | Ashley et al. |
| 2007/0022125 | A1 | 1/2007 | Salam et al. |
| 2007/0054646 | A1 | 3/2007 | Smith |
| 2007/0083493 | A1 | 4/2007 | Dwork et al. |
| 2007/0124268 | A1 | 5/2007 | Dwork et al. |
| 2007/0130147 | A1 | 6/2007 | Dwork et al. |
| 2007/0136027 | A1 | 6/2007 | Dwork et al. |
| 2007/0143289 | A1 | 6/2007 | Dwork et al. |
| 2007/0147606 | A1 | 6/2007 | Dwork et al. |
| 2007/0150437 | A1 | 6/2007 | Dwork et al. |
| 2009/0254971 | A1 | 10/2009 | Herz et al. |

OTHER PUBLICATIONS

A Privacy-Preserving Index for Range Queries, Bijit Hore et al., Proceedings of the 30$^{th}$ VLDB Conference, Toronto, Canada, 2004.*

Killian, J., "Secure Computation," *Cryptography Tutorial*, http://www.cs.rutgers.edu/~jkilian/lectures, downloaded from the Internet on Feb. 27, 2006.

U.S. Appl. No. 11/291,131, filed Nov. 30, 2005, Dwork, et al.

U.S. Appl. No. 11/292,884, filed Dec. 2, 2005, Dwork, et al.

U.S. Appl. No. 11/298,563, filed Dec. 9, 2005, Dwork, et al.

U.S. Appl. No. 11/305,800, filed Dec. 16, 2005, Dwork, et al.

U.S. Appl. No. 11/316,761, filed Dec. 22, 2005, Dwork, et al.

Ben-Or, M., et al., "Completeness theorems for non-cryptographic fault-tolerant distributed computation," *ACM*, 1988, 1-10.

Blum, A., et al., "Practical privacy: The SuLQ framework," *PODS*, 2005, 128-138.

Chawla, S., et al., "On the utility of privacy-preserving histograms," *UAI Press*, 2005, 120-127.

Chawla, S., et al., "Toward privacy in public databases," *Theory of Cryptography Conference*, 2005, 363-385.

Dwork, et al., "Privacy-preserving datamining in vertically partitioned databases," *Crypto*, 2004, 17 pages.

Goldreich, O., et al., "How to play any mental game," *ACM*, 1987, 218-229.

Ben-Or, M., et al., "Completeness theorems for non-cryptographic fault-tolerant distributed computation," *ACM*, May 2-4, 1988, pp. 1-10.

Blum, A., et al., "Practical privacy: The SuLQ framework," in 24th ACM SIGMOD International Conference on Management of Data / Principles of Database Systems, Baltimore (PODS 2005), Baltimore, Maryland, USA, Jun. 2005; pp. 128-138.

Chawla, S., et al., "On the utility of privacy-preserving histograms," in Uncertainty in Artificial Intelligence (UAI), Association for Uncertainty in Artificial Intelligence, Edinburgh, Scotland, Jul. 2005; pp. 120-127.

Chawla, S., et al., "Toward privacy in public databases," in Second Theory of Cryptography Conference, (TCC 2005), Springer Verlag, Cambridge, MA, USA, Feb. 2005, pp. 363-385.

Dwork et al., "Privacy-Preserving Datamining on Vertically Partitioned Databases," Microsoft Research, published Jun. 30, 2004, pp. 1-17.

Evfimievski, Alexandre Valentinovich; Privacy Preserving Information Sharing, A Dissertation Presented to the Faculty of the Graduate School of Cornell University i Partial Fulfillment of the Requirements for the Degree of Doctor of Philosophy, Aug. 2004.

Hore, Bijit et al.; A Privacy-Preserving Index for Range Queries, Proceedings of the 30th VLDB Conference, Toronto, Canada, 2004.

Online Encyclopedia Entry, "Side-Channel Attack," Wikipedia, published Oct. 13, 2008, pp. 1-4.

Unknown, "Side Channel Attack," Wikipedia, published Jul. 18, 2004, pp. 1-3.

In the United States Patent and Trademark Office, Non Final Rejection dated Jun. 6, 2008, 17 pages, in U.S. Appl. No. 11/292,884, filed Dec. 2, 2005.

In the United States Patent and Trademark Office, Final Rejection dated Jan. 6, 2009, 15 pages, in U.S. Appl. No. 11/292,884, filed Dec. 2, 2005.

In the United States Patent and Trademark Office, Notice of Allowance dated Apr. 16, 2009, 4 pages, in U.S. Appl. No. 11/292,884, filed Dec. 2, 2005.

In the United States Patent and Trademark Office, Non FInal Rejection dated Feb. 9, 2007, 8 pages, in U.S. Appl. No. 11/298,563, filed Dec. 9, 2005.

In the United States Patent and Trademark Office, Final Rejections dated Aug. 13, 2007, 7 pages, in U.S. Appl. No. 11/298,563, filed Dec. 9, 2005.

In the United States Patent and Trademark Office, Advisory Action dated Oct. 24, 2007, 3 pages, in U.S. Appl. No. 11/298,563, filed Dec. 9, 2005.

In the United States Patent and Trademark Office, Notice of Allowance dated Jan. 10, 2008, 3 pages, in U.S. Appl. No. 11/298,563, filed Dec. 22, 2005.

In the United States Patent and Trademark Office, Non Final Rejection dated Mar. 11, 2008, 8 pages, in U.S. Appl. No. 11/316,761, filed Dec. 22, 2005.

In the United States Patent and Trademark Office, Final Rejection dated Oct. 15, 2008, 13 pages, in U.S. Appl. No. 11/316,761, filed Dec. 22, 2005.

In the United States Patent and Trademark Office, Non Final Rejection dated Mar. 18, 2009, 12 pages, in U.S. Appl. No. 11/316,761, filed Dec. 22, 2005.

In the United States Patent and Trademark Office, Final Rejection dated Oct. 23, 2009, 14 pages, in U.S. Appl. No. 11/316,761, filed Dec. 22, 2005.

In the United States Patent and Trademark Office, Non Final Rejection dated May 21, 2008, 16 pages, in U.S. Appl. No. 11/305,800, filed Dec. 16, 2005.

In the United States Patent and Trademark Office, Final Rejection dated Sep. 29, 2008, 15 pages, in U.S. Appl. No. 11/305,800, filed Dec. 16, 2005.

In the United States Patent and Trademark Office, Advisory Action dated Jan. 7, 2009, 3 pages, in U.S. Appl. No. 11/305,800, filed Dec. 16, 2005.

In the United States Patent and Trademark Office, Non Final Rejection dated Apr. 29, 2009, 10 pages, in U.S. Appl. No. 11/305,800, filed Dec. 16, 2005.

In the United States Patent and Trademark Office, Notice of Allowance dated Oct. 30, 2009, 8 pages, in U.S. Appl. No. 11/305,800, filed Dec. 16, 2005.

In the United States Patent and Trademark Office, Final Rejection dated May 30, 2008, 13 pages, in U.S. Appl. No. 11/244,800, filed Oct. 6, 2005.

In the United States Patent and Trademark Office, Advisory Action dated Sep. 18, 2008, 3 pages, in U.S. Appl. No. 11/244,800, filed Oct. 6, 2005.

In the United States Patent and Trademark Office, Non Final Rejection dated Jan. 23, 2009, 15 pages, in U.S. Appl. No. 11/244,800, filed Oct. 6, 2005.

In the United States Patent and Trademark Office, Final Rejection dated Jul. 20, 2009, 16 pages, in U.S. Appl. No. 11/244,800, filed Oct. 6, 2005.

In the United States Patent and Trademark Office, Non Final Rejection dated Nov. 19, 2007, 12 pages, in U.S. Appl. No. 11/244,800, filed Oct. 6, 2005.

In the United States Patent and Trademark Office, Non Final Rejection dated Nov. 15, 2007, 9 pages, in U.S. Appl. No. 11/291,131, filed Nov. 30, 2005.

In the United States Patent and Trademark Office, Final Rejection dated May 7, 2008, 8 pages, in U.S. Appl. No. 11/291,131, filed Nov. 30, 2005.

In the United States Patent and Trademark Office, Advisory Action dated Aug. 8, 2008, 2 pages, in U.S. Appl. No. 11/291,131, filed Nov. 30, 2005.

In the United States Patent and Trademark Office, Notice of Allowance dated Jan. 21, 2009, 4 pages, in U.S. Appl. No. 11/291,131, filed Nov. 30, 2005.

In the United States Patent and Trademark Office, Notice of Allowance dated Jul. 10, 2009, 6 pages, in U.S. Appl. No. 11/291,131, filed Nov. 30, 2005.

In the United States Patent and Trademark Office, Notice of Allowance dated Nov. 16, 2009, 6 pages, in U.S. Appl. No. 11/291,131, filed Nov. 30, 2005.

U.S. Appl. No. 11/244,800: Non Final Rejection, Jan. 6, 2010.

U.S. Appl. No. 11/305,800: Non Final Rejection, Jan. 9, 2008.

* cited by examiner

Exponential Distribution

Normal Distribution

Hybrid Distribution

```
┌─────────────────────────────┐
│ Evaluate Query to Determine │
│          Diameter           │
│             401             │
└─────────────────────────────┘
              │
              ▼
┌─────────────────────────────┐
│  Determine Function Used to │
│ Generate Noise Distribution │
│             402             │
└─────────────────────────────┘
              │
              ▼
┌─────────────────────────────┐
│  Calculate Privacy Parameter│
│             403             │
└─────────────────────────────┘
```

FIG. 4

SELECTIVE PRIVACY GUARANTEES

BACKGROUND

Data collection is used to gather information for a wide variety of academic, business, and government purposes. For example, data collection is necessary for sociological studies, market research, and in the census. To maximize the utility of collected data, all data can be amassed and made available for analysis without any privacy controls. Of course, most people and organizations ("privacy principals") are unwilling to disclose all data, especially in modern times when data is easily exchanged and could fall into the wrong hands. Privacy guarantees can improve the willingness of privacy principals to contribute their data, as well as reduce fraud, identity theft, extortion, and other problems that can arise from sharing data without adequate privacy protection.

A method for preserving privacy is to compute collective results of queries performed over collected data, and disclose such collective results without disclosing the inputs of the participating privacy principals. For example, a medical database might be queried to determine how many people in the database are HIV positive. The total number of people that are HIV positive can be disclosed without disclosing the names of the individuals that are HIV positive. Useful data is thus extracted while ostensibly preserving the privacy of the principals to some extent.

However, as one might imagine, clever adversaries might apply a variety of techniques to predict or narrow down the set of individuals from the medical database who are likely to be HIV positive. For example, an adversary might run another query that asks how many people both have HIV and are not named John Smith. The adversary may then subtract the second query output from the first, and thereby learn the HIV status of John Smith without ever directly asking the database for a name of a privacy principal. With sensitive data, it is useful to provide verifiable privacy guarantees. For example, it would be useful to verifiably guarantee that nothing more can be gleaned about any specific privacy principal than was known at the outset.

Adding noise to a query output can enhance the privacy of the principals. Using the example above, some random number might be added to the disclosed number of HIV positive principals. The noise will decrease the accuracy of the disclosed output, but the corresponding gain in privacy may warrant this loss. The concept of adding noise to a query result to preserve the privacy of the principals is discussed in U.S. patent application Ser. No. 11/244,800, filed Oct. 6, 2005; U.S. patent application Ser. No. 11/298,563, filed Dec. 9, 2005 (U.S. Pat. No. 7,363,192); U.S. patent application Ser. No. 11/292,884, filed Dec. 2, 2005 (U.S. Pat. No. 7,562,071); U.S. patent application Ser. No. 11/305,800, filed Dec. 16, 2005; U.S. patent application Ser. No. 11/291,131, filed Nov. 30, 2005; and U.S. patent application Ser. No. 11/316,761, filed Dec. 22, 2005. Some additional work on privacy includes Chawla, Dwork, McSherry, Smith, and Wee, "Toward Privacy in Public Databases," Theory of Cryptography Conference, 2005; Dwork, Nissim, "Privacy-Preserving Data Mining in Vertically Partitioned Databases," Crypto 2004; Blum, Dwork, McSherry, Nissim, "Practical Privacy: The SuLQ Framework," PODS 2005; and Chawla, Dwork, McSherry, Talwar, "On the Utility of Privacy-Preserving Histograms," UAI 2005.

Even when noise is added to results, adversaries may be able to glean information about privacy principals by running a multitude of queries and comparing the outputs. This problem can be addressed by requiring that each of at most T queries of the data be a simple summation of the result of applying a fixed function to the data pertaining to each privacy principal, and queries beyond the $T^{th}$ are not answered.

In addition to the above, so-called secure function evaluation techniques, developed in the 1980's, were a major advance in the ability of people, organizations, or other entities ("privacy principals") to compute a collective result without disclosing their individual data to one another. Secure function evaluation is explored in a variety of academic publications. For a background discussion of secure function evaluation, please refer to Ben-Or, Goldwasser, and Wigderson, "Completeness Theorems for Non-Cryptographic Fault-Tolerant Distributed Computation" (1988), and/or Goldreich, Micali, and Wigderson, "How to Play Any Mental Game" (1987).

SUMMARY

The present invention provides systems and methods selectively determining privacy guarantees. For example, a first class of data may be guaranteed strong privacy, while other data classes are only guaranteed weak privacy. An amount of privacy is guaranteed by adding noise values to database query outputs. The noise is selected from a noise distribution, where a wide distribution generally provides strong privacy, and a narrow distribution generally provides weak privacy. Noise distributions can be tailored to be appropriate for the particular data in a given database by calculating a "diameter" of the data. When the distribution is based on the diameter of a first class of data which is guaranteed a first privacy level, and the diameter measurement does not account for additional data in the database that may be guaranteed little or no privacy, the result is that query outputs leak information about the additional data. Noise distribution calculations can also utilize a privacy parameter to adjust privacy as desired. In some embodiments, the first class of data may be guaranteed strong privacy using a strong privacy parameter to calculate a noise distribution, while any additional data is guaranteed weaker privacy by using a weak privacy parameter. Additional aspects and embodiments of the invention are described in detail below.

BRIEF DESCRIPTION OF THE DRAWINGS

The systems and methods for preserving privacy of data used in calculating an output in accordance with the present invention are further described with reference to the accompanying drawings in which:

FIG. 4 illustrates a method for determining an amount of privacy guaranteed to privacy principals supplying data, wherein said data is used in calculating a collective noisy output.

DETAILED DESCRIPTION

Figure 1:
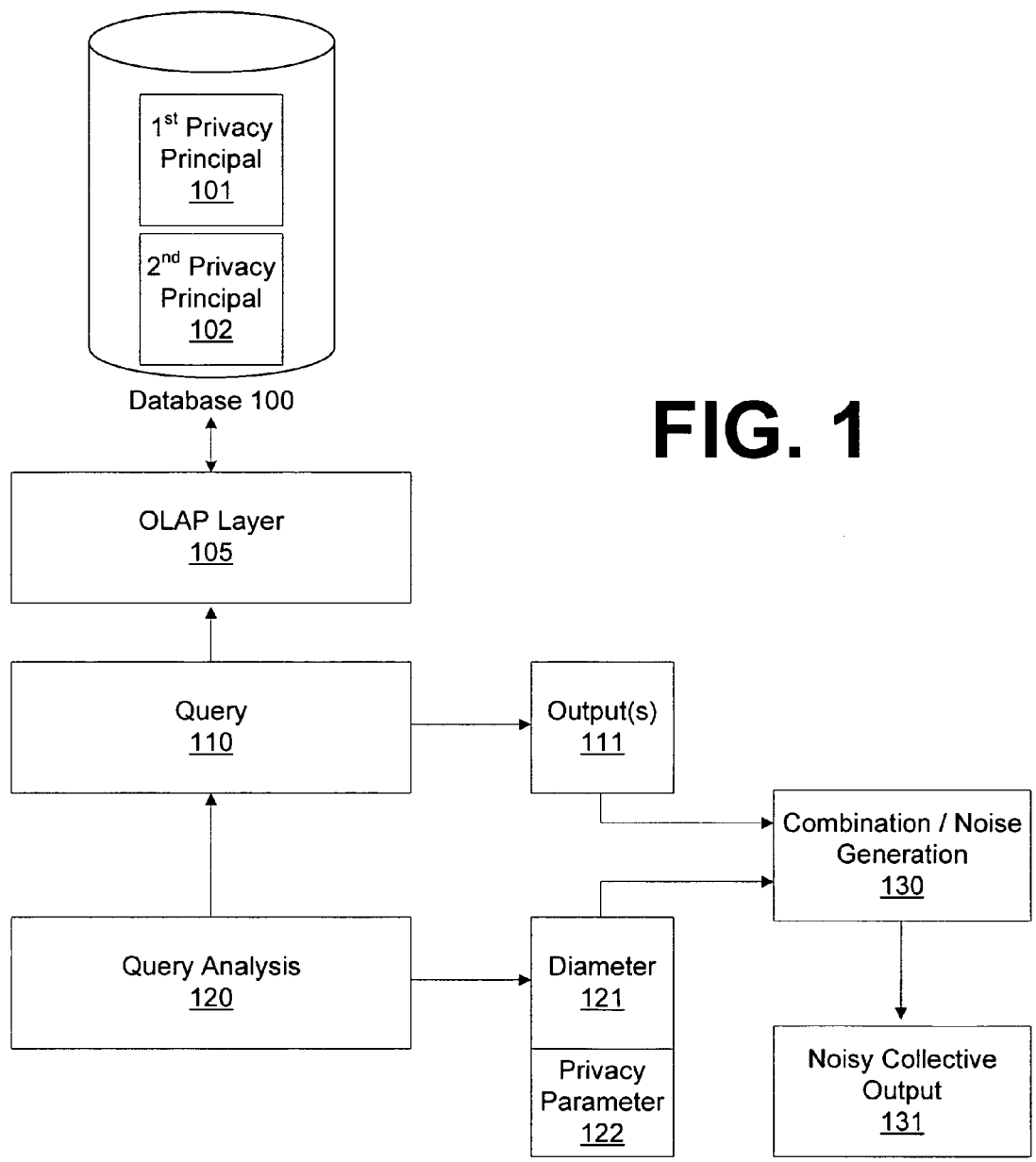
FIG. 1 illustrates a system for generating a noisy collective output 131, wherein said system preserves privacy of data used in calculating said noisy collective output.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Overview

Embodiments of the invention provide a privacy mechanism that selectively preserves privacy associated with certain properties of privacy principals, while permitting the exposure of other properties. A concrete recurring example is that of detecting criminals, such as possible terrorists: most people support the detection and interception of terrorists, placing little or negative value on the privacy of a person's status as terrorist, but many worry that the methods used for detection pose other privacy risks. Thus we want to permit certain specific information to leak from a database, while other types of information remain protected.

We begin by describing how to calculate a noise distribution using at least in part a diameter measurement of a particular query or dataset. Next, we explain how the diameter measurement may exclude certain classes of data, thereby selectively reducing privacy guarantees with respect to such data.

Calculating Noise Using a Noise Distribution, Query Diameter, and Privacy Parameter First, concepts associated with the query or dataset diameter will be introduced and examples to illustrate this concept will be set forth.

A query is a function applied to data. In a simple case, a query function may ask a database, for each person (privacy principal) in the database, does the person have blue eyes? If yes, the function returns a 1 (one) and if no, it returns a 0 (zero). A collective output may then be calculated by summing the individual outputs.

Extending the eye color example, imagine a database that contains eye color data for a plurality of people. Each person may have just one eye color, brown, blue, or green. A hypothetical attacker determined to find the true eye color of a particular person but that only has access to collective outputs from the database might see a collective output of a brown eye query and find that 82 people have brown eyes.

Next, two privacy principals, including the individual the attacker is interested in, leave the database. The attacker views the collective outputs of a subsequent query, finding that 81 people have brown eyes. Now the attacker knows there is some likely chance that the individual has brown eyes. If the attacker further knows that one of the departing privacy principals has blue eyes, he learns with certainty that the other has brown eyes.

When random noise is added to the collective outputs, the attacker's task becomes more difficult. However, noise also decreases the accuracy and therefore utility of the output.

Noise is some undisclosed value that is added to an output, thereby generating a noisy output. Noise should ideally be sufficient to stymie the attacker but not so great that it overly impacts output utility.

The exact value of noise added to a particular collective output cannot be disclosed—if it were, there would be no point in adding noise. However, a distribution that describes the likelihood of possible noise values can be disclosed, so that all people viewing the collective outputs are aware of the likelihood that the noisy collective output is close to the actual collective output.

Figure 2A:
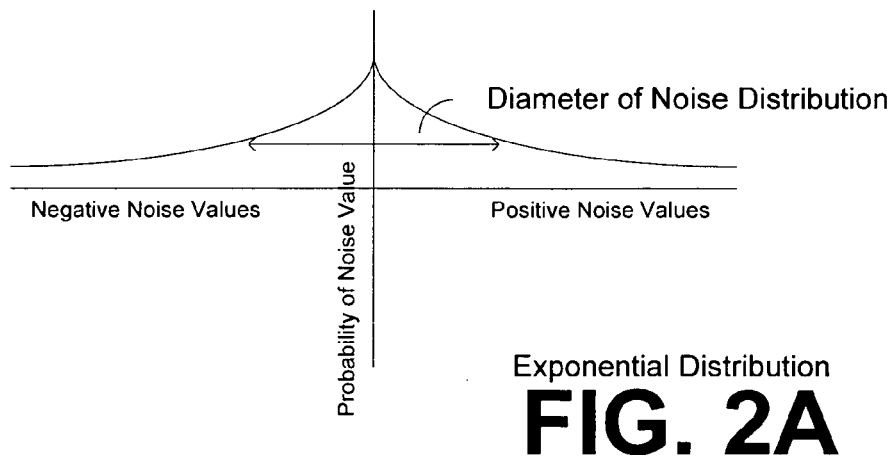
FIG. 2A illustrates an exponential distribution of possible noise values to add to a collective output.
Figure 2B:
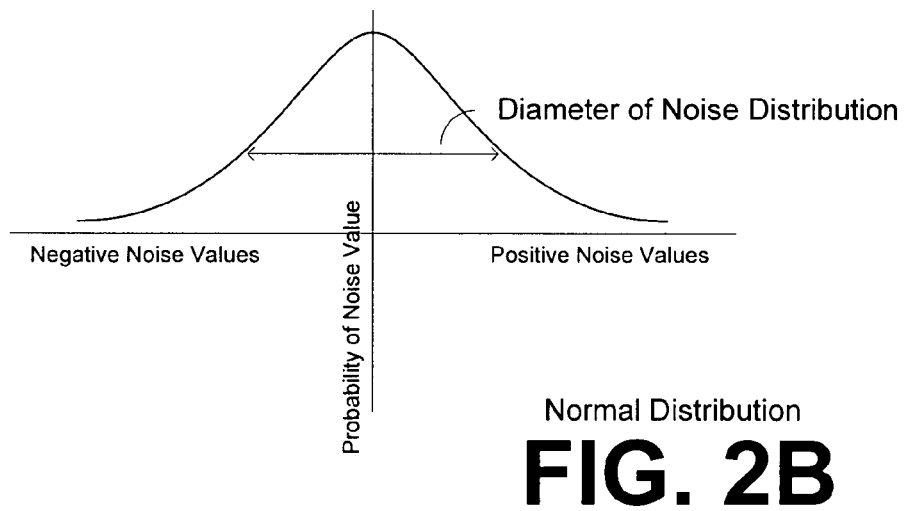
FIG. 2B illustrates a normal distribution of possible noise values to add to a collective output.
Figure 2C:
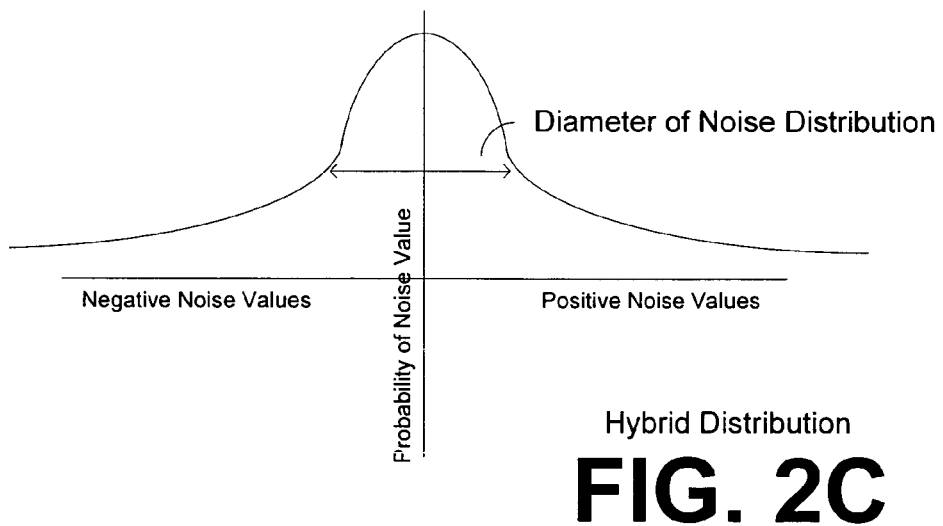
FIG. 2C illustrates a hybrid distribution of possible noise values to add to a collective output.

What noise distributions are appropriate? In the eye color example above, imagine a corresponding noise distribution makes it equally likely that a noise value anywhere from −100 (negative one hundred) and 100 (one hundred) is added. Noise values with an absolute value above 100 are very unlikely. Such a distribution would surely protect privacy, but in this case at an unacceptably high utility cost. If the true number of people with brown eyes is 82 (eighty-two), but the noisy output is equally likely to be anywhere from −18 to 182,those wanting some realistic prediction of how many people have brown eyes will not be satisfied. Note that there are a number of other reasons this type of noise distribution is undesirable. For example, if all noise values in the range [−100,100] are equally likely, and noise value probability plummets down outside this range, the adversary would know upon seeing an output of −100 (negative one hundred) that the original value was 0 (zero), and not 1 (one). Distributions such as those of FIG. 2A-2C are preferable because they have the property that 0 (zero) is the most likely, while the likelihood of other noise values decreases with their distance from 0 (zero).

Conversely, if the noise distribution makes it equally likely that a noise value between −0.001 (negative one one thousandth) and 0.001 (one one thousandth) will be added to the collective result, but very unlikely that noise with an absolute value beyond 0.001 will be added, then the noise distribution will lead to very high output utility, but at the expense of privacy. In this case, the privacy principals will have no meaningful additional privacy due to noise, because the attacker can simply round to the nearest whole number. If the disclosed noisy output is 81.999 people with brown eyes, the attacker knows that the actual collective output was probably 82.

To determine an appropriate noise distribution, we propose evaluating a query to determine the maximum difference in the collective output attributable to a particular privacy principal. We refer to this maximum difference as the diameter of a query. In the brown eye query example above, the diameter is 1 (one). Either a principal has brown eyes, in which case she increases the output of a brown eye query by 1 (one), or she does not have brown eyes, in which case she does not increase the collective output of a brown eye query at all.

Thus, an exemplary appropriate noise distribution can comprise a high likelihood that a noise value of −1 (negative one), 0 (zero), or 1 (one) will be added to the collective result, a somewhat lower likelihood of a noise value with an absolute value of 2 (two), still less likelihood of noise with an absolute value of 3 (three), and so forth. The diameter of a query can thus be used to determine an appropriate distribution of noise values.

Now consider a slightly different database that also contains eye color data for a plurality of people. This time, however, the database accounts for the fact that some people have a first eye with a first color, and a second eye with a second color. Therefore, the database allows a person to have a maximum of two eye colors, e.g. brown and blue, brown and green, or blue and green.

A query can ask, "How many people have at least one brown eye and how many people have at least one blue eye?" The diameter of such a query is 2 (two). That is, any one principal can make a maximum difference of 2 (two) to the collective output. Such a principal may have one brown eye and one blue eye in which case she causes each of a brown eye output and a blue eye output to increase by 1 (one). Alternatively, if the principal leaves the database, the effect will be that her data adds nothing (zero) to each of the outputs. Therefore the diameter of the query is 2 (two).

It should be noted that the diameter concept can be applied to datasets as well as queries. For example, the dataset associated with the U.S. Census might be analyzed, a diameter could be calculated for the entire dataset, and the diameter measurement could subsequently apply to any queries that are performed over the dataset. Dataset analysis to choose a diameter may be imperfect in some situations, resulting in diameter measurements that are too large or too small for a particular query. Dataset diameter measurements may nonetheless be an improvement in that the dataset diameter helps tailor the noise distribution to some degree. Such embodiments may be appropriate in situations where query analysis is difficult or computationally expensive.

The problem of computing the diameter is not always easily solved. In one embodiment, diameter is determined by analyzing a query function. For example, interested persons may analyze functions of interest, and publish papers proving bounds on their diameters. These functions with proven bounds will be used in conjunction with various implementations the invention. For various sets of related simple query functions, algorithms for analyzing the function and computing a diameter for an arbitrary function f within the set may also be developed.

In other embodiments, diameter of a function may be determined empirically. Empirical diameter determinations are risky because they may result in inappropriately scaled noise distributions. Nonetheless, empirical diameter determinations may be appropriate in certain settings. Empirical diameter determinations may be made, for example, by varying actual data in a database, running queries, and measuring differences in resulting collective outputs. Analytical diameter determinations are considered preferable, however, because they allow for quantifying diameter over all possible databases, not just a single database.

While the diameter of a query can be used to determine an appropriate distribution of noise values; diameter need not be the only variable in shaping a distribution. Another variable, referred to herein as epsilon, is a privacy parameter that may be used to increase or decrease the amount of privacy that is ensured. When epsilon is used to widen the distribution of possible noise values, it enhances privacy beyond the amount that would be ensured by using diameter alone in a particular distribution equation. Conversely, if epsilon is used to narrow the distribution, it decreases privacy from what would be obtained using diameter alone. Thus, epsilon values can represent an amount of enhanced privacy. The extent to which epsilon impacts privacy can be tailored by the distribution equation that is selected.

Preferred embodiments will therefore utilize a privacy parameter, as well as a diameter measurement, to generate a noise distribution. Embodiments that do not use a privacy parameter will effectively set epsilon to 1 (one) which corresponds to some amount of privacy loss that may be more or less than desired in the particular situation.

The concepts introduced above will now be revisited and exemplary calculations that may be used in systems and methods incorporating the query diameter concept will be set forth.

For any arbitrary query functions, the magnitude of noise values that are likely to be added to the collective outputs can be tailored to the query functions. We first view a collection of query functions as a single function, hereafter "f", which has multiple outputs. For each privacy principal "p" we can measure the diameter "diam" of their possible values under f: the maximum difference in f that can be attained by varying the data of the principal while holding the rest of the data constant.

$$\mathrm{diam}(f, p) = \max\_\{x, y: x, y \text{ disagree only on } p\} \|f(x) - f(y)\|$$

Here we are measuring distance by looking at the size of $\|f(x) - f(y)\|$, and there are several possible ways to measure this quantity. We will describe two, and the different noise distributions they suggest.

$$\mathrm{diam1}(f, p) = \max\_\{x, y: x, y \text{ disagree only on } p\} \|f(x) - f(y)\|\_1$$

$$\mathrm{diam2}(f, p) = \max\_\{x, y: x, y \text{ disagree only on } p\} \|f(x) - f(y)\|\_2\verb|^|2$$

Knowing the diameter of a function f with respect to a principal p, we can ensure a certain degree of privacy simply by choosing to add appropriately distributed noise to the answer f(x) before returning it. Two examples of noise distributions include:

noise~exp(-\epsilon$\|$x$\|$/diam1(f,p))//"exponential" noise—see FIG. 2A.

noise~exp(-\epsilon$\|$x$\|$^2/diam2(f,p))//"normal" noise—see FIG. 2B.

Here \epsilon is a privacy parameter that determines an amount of privacy that is ensured. Note that in this embodiment, an epsilon of zero will correspond to zero privacy loss, but will also render the database useless because the amount of added noise becomes infinite.

The concepts introduced above will now be revisited once again, and elaborated with reference to appended FIG. 1-FIG. 4.

FIG. 1 presents a system for generating a noisy collective output 131, wherein said system preserves privacy of data used in calculating said noisy collective output 131. A database 100 is configured to store data associated with a plurality of privacy principals 101, 102 and configured with a query mechanism 110 to run queries on said data to obtain a plurality of outputs 111. The database 100 may be configured with an Online Analytical Processing (OLAP) Layer 105. Outputs 111 can be combined to produce a collective output. In FIG. 1, output 111 combination could occur, for example, in a noise generation mechanism 130 that both combines outputs 111 and calculates an amount of noise to add to the combined outputs, then reveals a noisy collective output 131.

A database 100 is a collection of data, typically describing the activities of one or more related organizations, people, or other entities referred to herein as privacy principals. For example, a university database might contain information about entities, such as students, faculty, courses, and classrooms, and relationships between entities, such as student enrollment in courses, faculty teaching courses, and the use of rooms for courses. A database management system, or DBMS, is software designed to assist in maintaining and utilizing large collections of data. For the purpose of this document, however, the term "database," or "database server"

refers to either or both of a collection of data and DBMS software. Thus, database 100 illustrates a database server comprising both collections of data and DBMS. Note that as such database 100 may include the various other elements presented in FIG. 1 which are illustrated separately to clearly suggest the operation of the invention.

Various DBMS products, e.g. MICROSOFT SQL SERVER®, IBM DB2®, ORACLE DATABASE®, and SYBASE IQ® have greatly extended the capabilities of databases. Databases can store a wide variety of data types, such as images and text, and can perform complex queries on stored data. Specialized systems have been developed by numerous vendors for creating data warehouses, consolidating data from several databases, and for carrying out specialized analysis. All such products and database configurations are suitable for use in connection with the systems and methods herein.

Query mechanism 110 can perform any desired queries over data in databases. Queries can be simple or complex, and can generate single outputs or multiple outputs. Also, a privacy principal can be any defined entity or group of entities.

A query analysis mechanism 120 determines a maximum difference in a collective output, or diameter 121 of a particular query. A query need not actually be run against the data in database 100 in order to analyze the query. Query analysis can proceed by analysis of the query itself, thereby determining the query diameter 121. Query analysis can be implemented in a plurality of acceptable ways.

In one embodiment, query analysis proceeds by finding a predetermined query diameter. For example, interested persons may analyze functions of interest, and publish papers proving bounds on their diameters. These functions with proven bounds will be used in conjunction with various implementations the invention. Query analysis mechanism 120 may thus match a query to a known diameter for said query.

In another embodiment, query analysis may recognize a query as from a set of related simple query functions for which query analysis algorithms are available. An appropriate algorithm may be applied to analyze the function and compute a diameter.

In other embodiments, diameter of a function may be determined empirically. As mentioned above, empirical diameter determinations are risky because they may result in inappropriately scaled noise distributions. Nonetheless, empirical diameter determinations may be appropriate in certain settings.

For example, in one embodiment, query analysis might actually take up a privacy principal 101 in database 100, save the initial state of the privacy principal 101, and then run a query against it a number of times, varying the data by altering it each time, to determine the query diameter. After testing to determine a diameter in this fashion, the privacy principal may be returned to its original state. In this embodiment, an actual collective output need not be calculated to determine query diameter. Instead it is simply known that outputs 111 can be combined to produce a collective output, and that if they are, the diameter in said collective output from varying data associated with a privacy principal 101 can be used to generate an appropriate noise distribution for such a collective output.

In another embodiment, the query itself can be analyzed without the need to actually run the query or alter the data of a privacy principal 101. Instead, the diameter is determined by varying the data of a hypothetical first privacy principal. In effect, a hypothetical first privacy principal is constructed that would have a maximum impact on a collective result. While no actual data in a privacy principal is altered, this is described herein as varying the data of a first privacy principal, because the data of such hypothetical principal is "varied" to the point at which it will have maximum impact. Meanwhile, the data associated with one or more hypothetical second privacy principals is effectively held constant by the assumption that such data does not change when measuring diameter using the hypothetical first principal.

It should be noted that it is preferable to make diameter determinations with regard for all possible databases, not just one single actual database. The analytic approach for determining diameter can account for all databases.

The system of FIG. 1 further comprises a noise generation mechanism 130. This mechanism may include a variety of functions, which may be outsourced to individual components or conducted by 130 as shown. Noise generation mechanism 130 calculates, using said diameter 121, a distribution of possible noise values to add to a collective output. The equations illustrated above provide exemplary approaches to calculating noise distributions. Exemplary noise distributions are further illustrated in FIG. 2A-2C.

FIG. 2A-2C depict noise values along an x-axis, and probabilities associated with such noise values on the y-axis. Thus, a noise value on the x-axis corresponding to a high value on the y-axis has a high probability of being selected. The illustrated distributions all share a beneficial feature of decreasing the probability a given noise value as its absolute value increases. This allows noisy outputs to nonetheless be useful, because the probability of an excessively high noise value can be remote.

FIG. 2A illustrates an exponential distribution, as will be recognized by those of skill in mathematics. FIG. 2B illustrates a normal distribution. FIG. 2C represents a hybrid distribution. The hybrid distribution of FIG. 2C is a normal and exponential distribution, such that a normal distribution defines a portion of the distribution comprising the most probable noise values, i.e. those with a higher y-axis value, and an exponential distribution defines a portion of the distribution comprising the least probable noise values, i.e. those with low y-axis values, corresponding to larger absolute values on the x-axis.

A diameter measurement can be used in calculating each of the distributions in FIG. 2A-2C. A large diameter value will widen the distribution, increasing the probability that larger x-axis (noise) values will be used. Conversely, a small diameter will decrease the likelihood of large noise values. The exemplary equations provided above are satisfactory, and those of skill in the art will be able to construct an infinite variety of distributions that successfully utilize a diameter measurement to create a satisfactory noise distribution. For example, an infinite number of small modifications to the distributions depicted in FIG. 2A-2C are possible.

The mechanism for calculating a noise distribution 130 may be configured to modify a noise distribution using a privacy parameter 122, wherein said privacy parameter 122 corresponds to an amount of privacy that is ensured. We refer to the privacy parameter as epsilon. An epsilon that effectively widens the distributions illustrated in FIG. 2A-2C will provide enhanced security and vice-versa. In the equations set forth above, epsilon is contemplated to be a less than one number in a denominator, with diameter in the numerator. Thus, a small epsilon leads to higher privacy. Any numbers of other ways to implement a privacy parameter are available to the skilled mathematician.

A system such as that illustrated in FIG. 1 can be used to protect the privacy of any types of data. For example, the data may be medical information, and the privacy principals may be people. The data may also comprise information submitted to a government agency, such as the Internal Revenue Service (IRS), wherein the privacy principals could be private individuals, companies, and/or other organizations.

To further demonstrate the usefulness of this approach to a noise distribution, a few examples of applications that were not possible in the previous frameworks may be instructive. Adding noise to collective outputs in the two examples below was not previously possible either because the queries could not be represented as summations, or because adding noise that depends only on a number of queries rendered the data useless.

First, so-called k-Means is a popular data analysis algorithm, that operates by iteratively asking a collection of data points for their averages under various partitions. Importantly, each point participates in at most one of the parts at a time, and as a consequence the number of parts does not enter into the amount of noise added. A system such as FIG. 1 can significantly improve the quality of the results given back, as the magnitude of noise is so much smaller.

Second, there are many situations where a firm may be interested in determining if they have the resources (staff, equipment, etc) to carry out a certain number of contracts, or more generally to determine the largest number of contracts they could fulfill with their current resources. In many cases it is important that their decision not leak information about their resources, either from the point of view of competitive advantage, or owing to privacy legislation. In either case, resource allocation commonly has the low diameter property: the presence or absence of a single employee is unlikely to change the total number of satisfiable contracts by more than a small amount. A single person can only do so much, and their absence only precludes those few things that they would otherwise have done. As such, this function can be computed and released noisily, ensuring the confidentiality of the particular resources that the firm has, while disclosing their capability of fulfilling the contracts. Importantly, it is unclear how this question could have been expressed in terms of a summation, and the more flexible diameter based perturbation allows computation that would not have been possible before.

Figure 3:
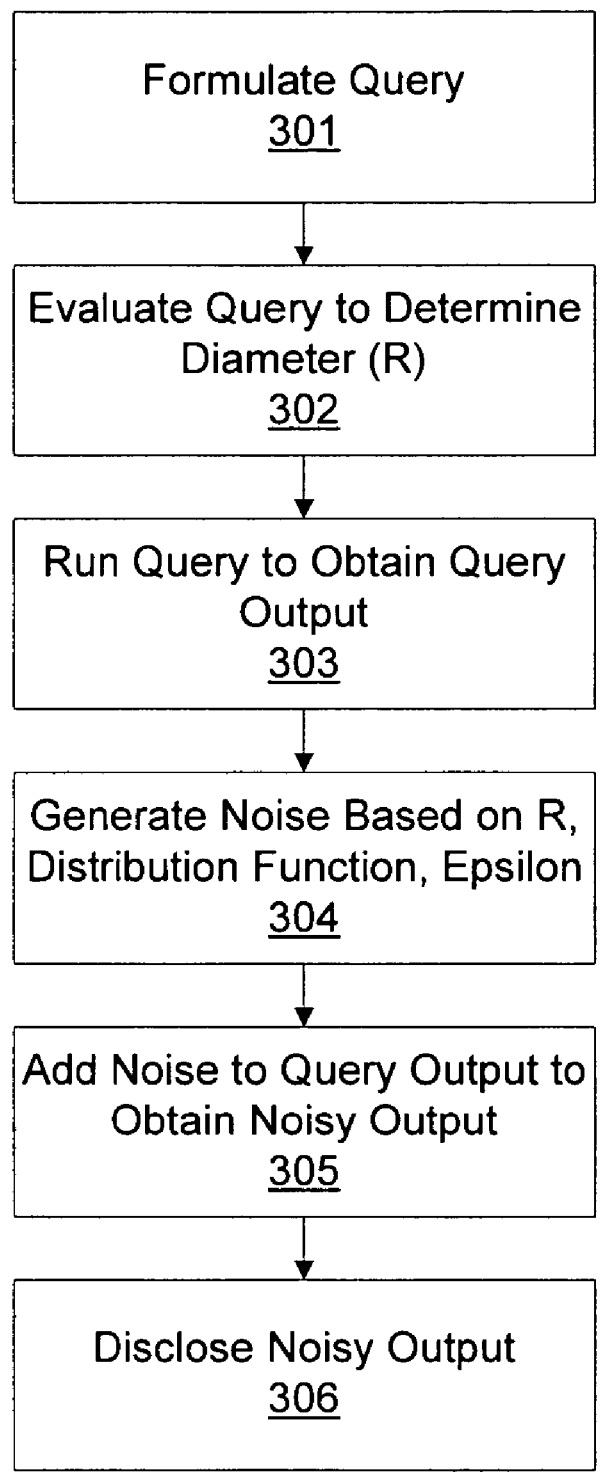
FIG. 3 illustrates a method for preserving privacy of data used in calculating an output.

With reference to FIG. 3, a method for preserving privacy of data used in calculating an output is illustrated. The method comprises first formulating whatever query is to be run against data in a database 301. Next, the query can be evaluated to determine a diameter (represented by the letter R) 302. The query can be performed on data associated with a plurality of privacy principals to obtain a plurality of outputs, and said plurality of outputs can be combined to produce a collective output. Evaluating the query 302 to determine a diameter comprises determining a maximum difference in said collective output from varying data associated with a first privacy principal while holding constant data associated with one or more second privacy principals, as explained above.

The query can be run in step 303, or this step may be postponed until after calculating an appropriate noise distribution in step 304. Calculating an appropriate noise distribution 304 comprises calculating using said diameter (maximum difference) a distribution of possible noise values to add to said collective output. The calculation may also make use of a privacy parameter that corresponds to an amount of privacy that is ensured. The calculation may contemplate any type of distribution curves, for example the exponential distribution in FIG. 2A, the normal distribution in FIG. 2B, or a hybrid distribution such as that of FIG. 2C.

Once a query is performed on said data associated with a plurality of privacy principals, the collective output from the query can be calculated, and a noise value from the calculated distribution can be added to the collective output to produce a noisy collective output 305. Finally, the collective noisy output can be disclosed 306, as can the noise distribution.

One interesting aspect of the invention is that it permits a useful backwards operation in which, for a given query diameter and a known noise distribution, the value of the privacy parameter epsilon can be determined. Thus, systems using the invention that disclose a query and a noise distribution also verifiably disclose the value of the privacy parameter that was used. Privacy principals can thus be informed or calculate for themselves the degree of privacy that is being used with their data.

A privacy principal that wished to calculate the privacy parameter that is being used with her data might carry out a method such as that illustrated in FIG. 4. Such a method is for determining an amount of privacy guaranteed to privacy principals supplying data, wherein said data is used in calculating a collective noisy output. The method comprises determining a query diameter 401, that is, determining a maximum difference in a collective output from varying data associated with a first privacy principal while holding constant data associated with one or more second privacy principals. Next, determine the distribution function that was used to generate a noise distribution 402. In the examples provided herein the distribution function has two variables: diameter (also referred to as maximum difference of a collective output) and epsilon, i.e. a privacy parameter corresponding to an amount of guaranteed privacy. If the distribution function and the diameter are known, epsilon can be calculated 403.

Using Diameter Measurements to Make Selective Privacy Guarantees

As described above, noise, or output perturbation, can be based on a distribution of noise that is carefully chosen based on the properties of the questions posed and/or the properties of a particular dataset. When making selective privacy guarantees, the distribution of noise will also be based on the data whose disclosure we want to permit, or make relatively weaker privacy guarantees.

To accommodate the revelation of certain properties, we will take the diameter measurement with respect to a subset of possible values that a privacy principal's data may take. This subset is referred to herein as a first class of data in a database. In the example of terrorism, we would consider the diameter as measured over the set of possible values that do not suggest terrorism. This diameter is then used to perturb the output, and ensures that an adversary gains no advantage discerning which of the non-terror related values a person might have. Intentionally, it makes no guarantees of protecting against an adversary learning whether or not a privacy principal's data corresponds to terrorism.

As an example, imagine a query that computes for each person a "terror score"—a sum of several terrorism indicators—and releases the maximum value. A small maximum value would imply, with high probability, that the collection of people was terror-free, whereas a high value would suggest not. With respect to any one person who scores low on all terrorism indicators, their diameter is small; there is no data in the set of non-terrorists that they could take on to greatly affect the output. As such, the diameter is small, and the amount of noise to be added is similarly small.

Exemplary Methods for Selectively Determining Privacy Guarantees

Figure 5:
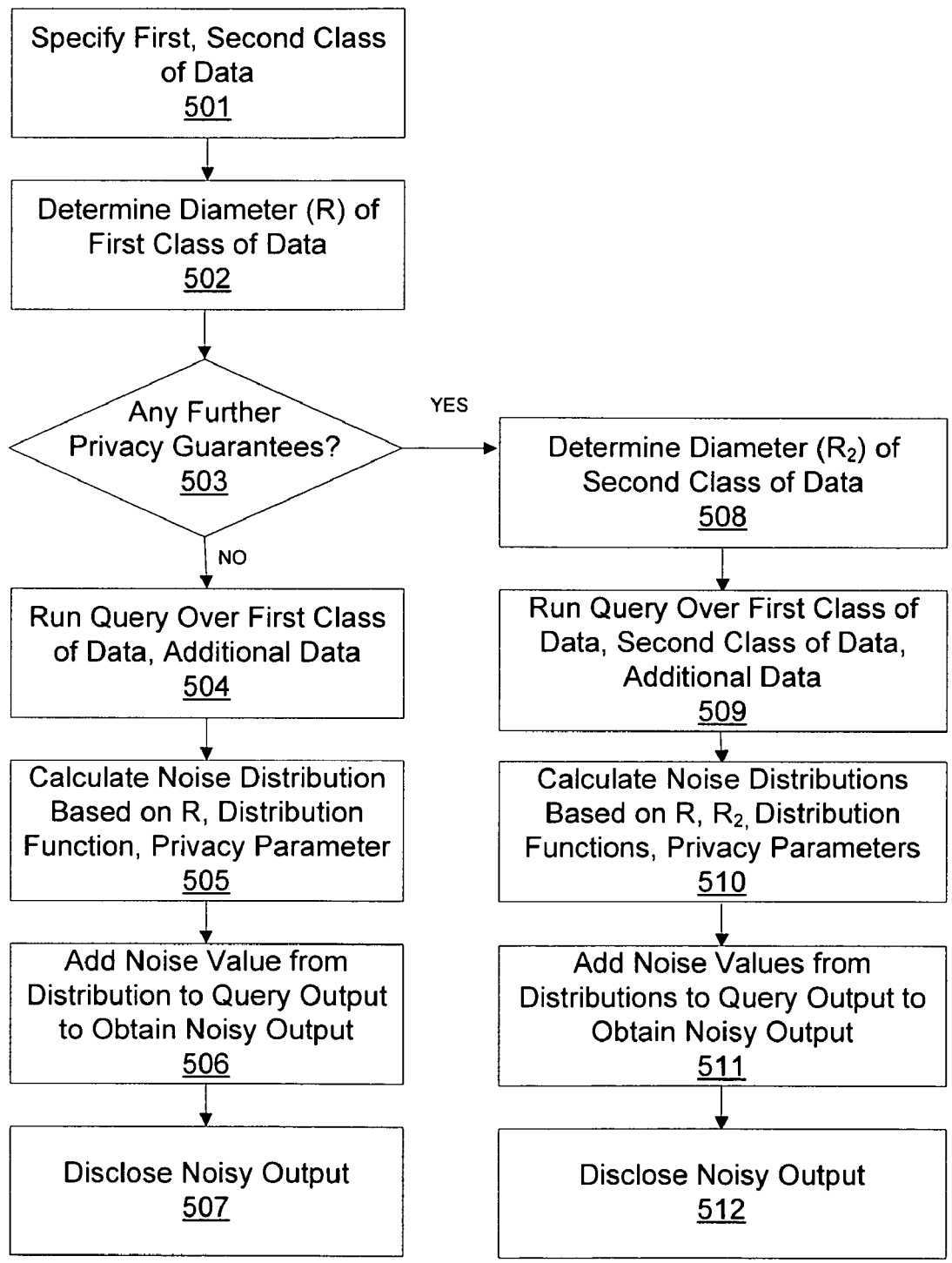
FIG. 5 illustrates a method for selectively determining privacy guarantees.

FIG. 5 illustrates a method for selectively determining privacy guarantees in accordance with an embodiment of the invention. Such a method may be carried out by a computer, such as a database server that executes computer readable instructions such as commercial DBMS software, or software designed to execute alongside DBMS software. First, the method may comprise specifying at least one first class of data in a database 501. The contemplated database comprises data corresponding to said first class of data. For example, in a database that comprises personal information about human privacy principals, a first class of data might be specified that comprises all health and medical information about the humans.

Such a class of data would likely comprise prescribed medications, significant past illnesses and injuries, known allergies, blood type, height and weight, and so forth, but likely would not comprise additional data such as name, address, criminal history, occupation, number of children, and so forth. Thus, we have a database that comprises a variety of data, some of it identified by a selected first class of data, and additional data that is not within said first class.

In another example, the first class of data is associated with a first class of people, such as non-criminals, while the additional data is associated with a second class of people, such as criminals. The first class of data may include data that is not considered an indicator for predisposition to engage in criminal activity, such as terrorism, drug trafficking, violent crime, or white-collar crime, while the additional data comprises data that is an indicator. Thus, the first class of data may include health information such as blood type, eye color, hair color, height and weight, official information such as social security number, date of birth, driver's license number, etc., while the additional information may include information such as criminal history, certain socioeconomic factors, and so on as determined by those who study criminology. The first class of people is people with a first risk of engaging in criminal behavior, and the second class of people is people with a second risk of engaging in criminal behavior which in this example is higher than the first risk.

In a third example, the first class of data may include data that is not considered an indicator for predisposition to have an infectious disease, such as influenza, HIV, or spinal meningitis, while the additional data comprises data that is an indicator. For example, it might be crucial under some circumstances to reduce privacy of information that allows health officials to isolate and contain an outbreak of disease. Factors such as recent travel locations, vaccinations, and so forth may therefore be given little or no privacy in some emergency circumstances.

A first diameter may be calculated (determined) for said first class of data 502, using the techniques described above. FIG. 5 contemplates two scenarios. The first scenario corresponds to steps 501-507, and contemplates a situation where privacy guarantees are made for the first class of data, but not made with respect to any additional data. The second scenario corresponds to steps 501-503 and 508-512, and contemplates multiple levels of privacy guarantees for multiple classes of data. These two scenarios will be addressed in turn.

In the first scenario, it is determined in step 503 that there are no additional privacy guarantees beyond the guarantees for the first class of data. For example, no guarantees are made for additional data that generally correlates to criminal predisposition. A query is performed over said first class of data and said additional data, producing a query output 504. A first noise distribution may be calculated at least in part using said first diameter 505, i.e. the diameter of the data not associated with criminal behavior, and also optionally using a privacy parameter as described above. The distribution is based on a distribution function such as those illustrated in FIG. 2A-2C.

A noise value selected from said first noise distribution can be added to the query output 506, and finally the noisy output may be disclosed 507.

In the second scenario, it is determined in step 503 that additional privacy guarantees will be made. Differing privacy guarantees may be made for any number of classes of data. The steps in making additional privacy guarantees generally track steps 504-512, differing in that different diameters and privacy parameters may be selected for additional classes of data.

Thus, in step 508, another diameter measurement is made, this time for a second class of data. For example, there might be some criminal indicators that are determined to warrant some weak degree of privacy, while other indicators do not warrant any privacy. Those indicators that warrant some privacy can be specified as a second class of data in a database comprise the second class of data for which a second diameter is calculated. A query is then performed over the dataset 509. This time, multiple noise distributions are calculated 510. Each distribution is based on its respective diameter and selected privacy parameter. Noise values are selected from each noise distribution 511 and added to the query output to obtain the noisy output. The noisy output is then disclosed 512.

Exemplary Systems for Selectively Determining Privacy Guarantees

Figure 6:
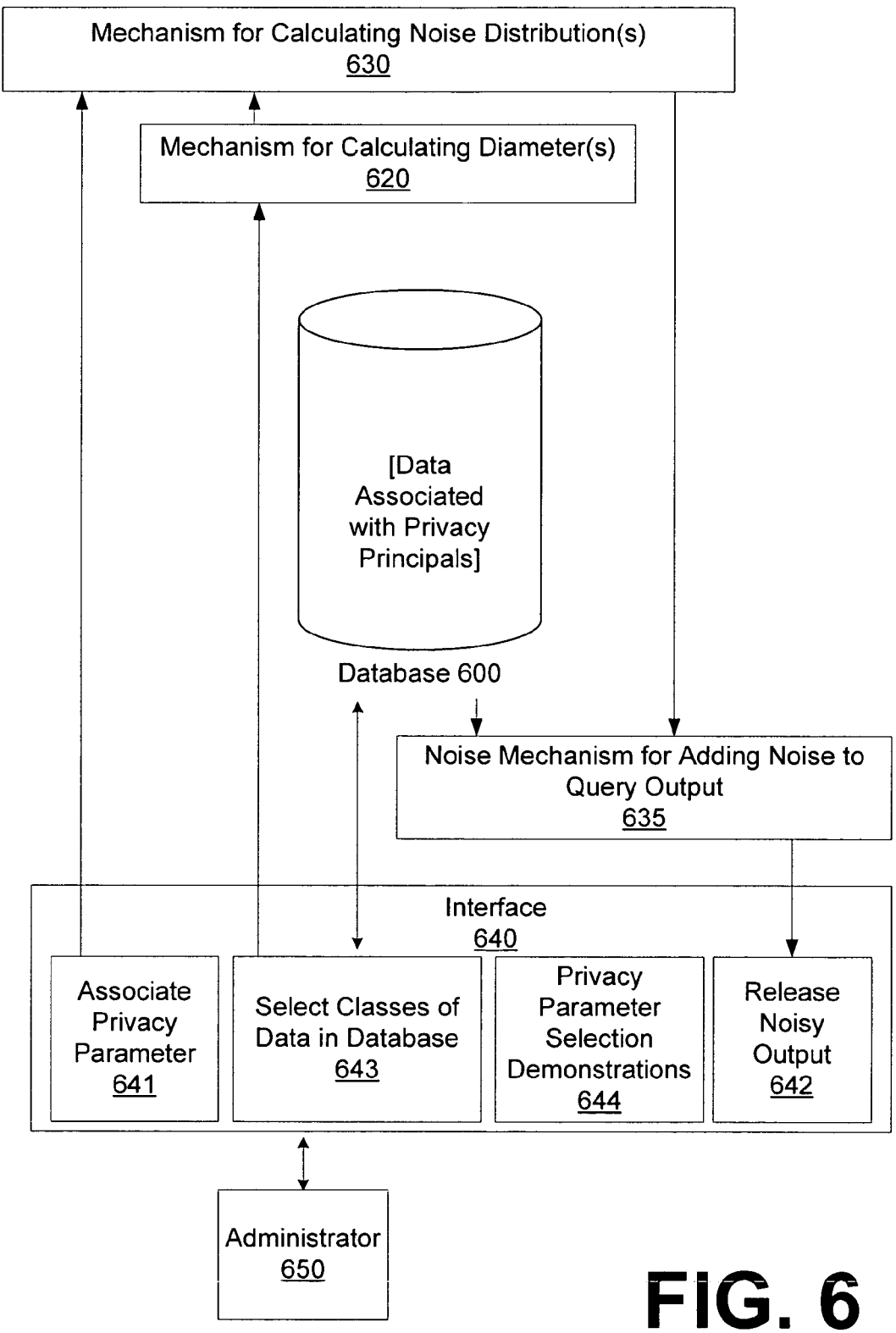
FIG. 6 illustrates a system for selectively guaranteeing privacy of data associated with privacy principals.

FIG. 6 illustrates a system for selectively guaranteeing privacy of data associated with privacy principals. In general, an administrator 650 can interact with a system comprising a database 600 through an interface 640. The administrator may select acceptable classes of data through 643, and associate privacy parameters with the various data classes through 641. The interface may also comprise means for releasing noisy query outputs 642, and privacy parameter selection demonstrations 643.

FIG. 6 comprises an interface 640 with means for selecting a first class of data associated with privacy principals 643. Here, the administrator 650 may see the various data, generally, that is contained in the database. The administrator need not have access to the actual data, but may instead have access to the types of data, for example if the database contains the ages of the various privacy principals, the administrator may be able to see that this information is in the database without being able to access anyone's actual age. Here, the administrator 650 may select the various types of data that are in a first class of data, for example, all data that is not deemed useful in determining whether a person is a terrorist. In an alternate embodiment, an interface component 643 for selecting types of data in the first class of data can allow selection of an exemplary privacy principal, and state that all data that is not null for that privacy principal is within the first class of data. Alternatively, two privacy principals may be compared, and data associated with the second privacy principal that is null for the first privacy principal may be considered outside the first class of data.

Demonstrations may be provided by 644 to assist in selecting an appropriate parameter. For example, a demonstration may be given of how to choose a privacy parameter associated with an amount of privacy loss that is acceptable to a privacy principal. A demonstration of an amount of privacy loss associated with a restrictive privacy parameter and an amount of privacy loss associated with an unrestrictive privacy parameter can be instructive. Interface 640 may also comprise a mechanism such as 642 for releasing noisy outputs to a user, such as administrator 650 interacting with the database 600.

Once a first class of data is selected via interface 640, the selection can be passed to a mechanism 620 for calculating a diameter of the administrator's selection. If the administrator makes multiple selections, mechanism 620 can compute multiple corresponding diameters. Calculated diameters can be passed to mechanism 630 for calculating noise distributions. Any associated privacy parameters may also be passed to 630, so that mechanism 630 may calculate distributions using the diameter of a selected dataset as well as the selected privacy parameter.

Once noise distribution(s) are calculated, the distribution(s) may be used by mechanism for selecting and adding a noise value to a query output 635. A query output is received by 635 from database 600, which may include DBMS, as described above, for running queries at least in part over the data associated with said privacy principals in database 600 and producing an output. If multiple noise distributions are present that correspond to data associated with a particular query output, then a noise value can be selected from each distribution, and all of the noise values may be combined with the query output.

The various mechanisms of FIG. 6 may be implemented via computer readable instructions. For example, mechanism 635 may comprise instructions for combining noise with database 600 query outputs, wherein the noise is selected from a noise distribution provided by 630. The noise distribution is in turn calculated using a diameter calculated by 620 and a privacy parameter provided by administrator 650 via interface component 641.

The various systems and methods discussed herein are contemplated to be carried out by one or more computing devices which are, in general, well understood. A computing device typically includes at least some form of computer readable media. Computer readable media can be any available media that can be accessed by the device. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by a device. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A method for selectively determining privacy guarantees, comprising:
   specifying at least one first class of data in a database, said database comprising data corresponding to said first class of data, and said database further comprising additional data;
   calculating a first diameter for said first class of data;
   calculating a first noise distribution at least in part using said first diameter,
      wherein a first privacy parameter is at least in part used when calculating said first noise distribution;
   performing a query over said first class of data and said additional data;
   adding a noise value selected from said first noise distribution to an output of said query;
   specifying at least one second class of data in the database;
   calculating a second diameter for said second class of data; and
   calculating a second noise distribution at least in part using said second diameter and a second privacy parameter.

2. The method of claim 1, wherein said first class of data is associated with a first class of people, and wherein said additional data is associated with a second class of people.

3. The method of claim 2, wherein said first class of people are people with a first risk of engaging in criminal behavior, and wherein said second class of people are people with a second risk of engaging in criminal behavior.

4. The method of claim 3, wherein said second risk is higher than said first risk.

5. The method of claim 3, wherein said criminal behavior comprises terrorism.

6. The method of claim 3, wherein said criminal behavior comprises trafficking of illegal drugs.

7. A method for selectively determining privacy guarantees, comprising:
   specifying at least one first class of privacy principals, said first class of privacy principals being associated with a first class of data in a database;
   specifying at least one second class of privacy principals, said second class of privacy principals being associated with said first class of data in a database, and said second class of privacy principals being further associated with a second class of data in a database;
   calculating a diameter of said first class of data;
   calculating a noise distribution at least in part using said diameter,
      wherein a first privacy parameter is at least in part used when calculating said noise distribution;
   adding a noise value selected from said noise distribution to a query output,
      wherein a query associated with said query output is performed at least in part over said first class of privacy principals and at least in part over said second class of privacy principals;
   calculating a second diameter for said second class of data; and
   calculating a second noise distribution at least in part using said second diameter and a second privacy parameter.

8. The method of claim 7, wherein said at least one first class of privacy principals and said at least one second class of privacy principals comprise human beings.

9. The method of claim 8, wherein said first class of data in a database comprises personal data that does not substantially correlate with criminal behavior, and wherein said second class of data in a database comprises personal data that substantially correlates with criminal behavior.

10. The method of claim 9, wherein said criminal behavior comprises terrorism.

11. The method of claim 9, wherein said criminal behavior comprises trafficking of illegal drugs.

12. The method of claim 9, wherein said criminal behavior comprises violent crime.

13. The method of claim 9, wherein said criminal behavior comprises white collar crime.

14. The method of claim 8, wherein said first class of data in a database comprises personal data that does not substantially correlate with an infectious disease, and wherein said second class of data in a database comprises personal data that substantially correlates with an infectious disease.

15. A system for selectively guaranteeing privacy of data associated with privacy principals, comprising:
 a database server;
 a database comprising data associated with a plurality of privacy principals;
 an interface for selecting a first class of data associated with said privacy principals,
  wherein said interface allows selecting of a second class of data associated with said privacy principals, and for associating a first privacy parameter with said first class of data and a second privacy parameter with said second class of data;
 a mechanism for calculating a diameter of said first class of data;
 a mechanism for calculating a noise distribution at least in part using said diameter,
  wherein a first privacy parameter is at least in part used when calculating said noise distribution;
 a mechanism for selecting a noise value from said distribution and adding said noise value to a query output,
  wherein a query associated with said query output is performed at least in part over said privacy principals;
 a mechanism for calculating a second diameter for said second class of data; and
 a mechanism for calculating a second noise distribution at least in part using said second diameter and said second privacy parameter.

16. The system of claim 15, wherein said interface allows for associating a first privacy parameter with said first class of data.

17. The system of claim 15, wherein said data associated with a plurality of privacy principals comprises personal data associated with a plurality of human beings.

* * * * *